(12) United States Patent
McAnally

(10) Patent No.: US 11,194,873 B1
(45) Date of Patent: Dec. 7, 2021

(54) GRID-BASED RANKING OF LOCATION DATA

(71) Applicant: United Services Automobile Association (USAA), San Antonio, TX (US)

(72) Inventor: Blake William McAnally, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 915 days.

(21) Appl. No.: 15/583,390

(22) Filed: May 1, 2017

Related U.S. Application Data

(60) Provisional application No. 62/338,070, filed on May 18, 2016.

(51) Int. Cl.
| | |
|---|---|
| *G06F 16/29* | (2019.01) |
| *G06F 16/9535* | (2019.01) |
| *H04L 29/08* | (2006.01) |
| *G06F 16/9038* | (2019.01) |

(52) U.S. Cl.
CPC .......... *G06F 16/9535* (2019.01); *G06F 16/29* (2019.01); *G06F 16/9038* (2019.01); *H04L 67/18* (2013.01)

(58) Field of Classification Search
CPC ............. G06F 16/2246; G06F 16/9537; G06F 16/9535; G06F 16/9038; G06F 16/29; H06L 67/18
USPC ........................................................ 707/724
See application file for complete search history.

(56) References Cited

U.S. PATENT DOCUMENTS

| | | | | |
|---|---|---|---|---|
| 2009/0019031 | A1* | 1/2009 | Krovitz | G06F 16/54 |
| 2010/0036806 | A1* | 2/2010 | Lam | G06Q 30/00 |
| | | | | 707/706 |
| 2010/0036807 | A1* | 2/2010 | Lieske, Jr. | G06F 16/9537 |
| | | | | 707/737 |
| 2010/0191797 | A1* | 7/2010 | Seefeld | G06F 16/29 |
| | | | | 709/203 |
| 2011/0004608 | A1* | 1/2011 | Solaro | G06F 16/951 |
| | | | | 707/759 |
| 2015/0310036 | A1* | 10/2015 | Wirola | G06F 16/29 |
| | | | | 707/741 |
| 2016/0066179 | A1* | 3/2016 | Huang | H04W 8/16 |
| | | | | 726/26 |

\* cited by examiner

*Primary Examiner* — Hosain T Alam
*Assistant Examiner* — Robert F May
(74) *Attorney, Agent, or Firm* — Fletcher Yoder, P.C.

(57) ABSTRACT

The present disclosure relates to methods for ranking location data to increase processing efficiency and user-interface usability. A method includes receiving from a client a query that defines an area, subdividing the area into a plurality of grid areas, and determining a set of locations that are disposed in the area. The method includes dividing the set of locations into a plurality of groups based on the grid area that corresponds to each respective location. Within each group, the method includes scoring and sorting the locations according to a set of criteria, and assigning a respective rank to each of the locations according to the relative position of each of the locations in the group. The method further includes recombining the locations of plurality of groups and sorting by rank to yield a grid-ranked set of locations, and sending to the client the grid-ranked set of locations.

20 Claims, 6 Drawing Sheets

GRID-BASED RANKING OF LOCATION DATA

CROSS-REFERENCE TO RELATED APPLICATIONS

The present application claims priority to and benefit of U.S. Provisional Application No. 62/338,070, filed May 18, 2016 and entitled "Grid-Based Ranking of Location Data," which is incorporated by reference herein in its entirety for all purposes.

BACKGROUND

The present disclosure relates generally to electronic location and mapping systems, and more specifically, to methods for ranking location data used by electronic location and mapping systems.

Electronic location and mapping systems generally enable a wide range of functionality and features. For example, global positioning system (GPS), assisted GPS, and other location systems are included in various vehicles and smart phones to enable a user to accurately determine their location. These location systems may be integrated with mapping systems, as well as various traffic and weather systems, that enable users to plot travel routes to destinations. These mapping systems may also store and provide location data regarding potential destinations, such as automated teller machines (ATMs), banks, business locations, and a user may select among these potential destinations to plot a desired travel route.

However, especially in urban centers, the density of potential destinations tends to increase, which it is now recognized can result in information glut, in which the user is overloaded with location information to the point that it reduces the ability of the user to effectively utilize the location and mapping system. For example, a person may use a smart phone mapping app to attempt to locate an ATM in a large city. In such a situation, the user may be presented with a map that includes such a large number of results that they overlap and obscure one another and/or large portions of the map, making it difficult for the user to identify and/or select a desired destination.

BRIEF DESCRIPTION

In an embodiment, a method includes: receiving, from a processor of a client, a query that defines an area; determining, using a processor of a server, a cluster size based on the size of the area; subdividing, using the processor of the server, the area into a plurality of grid areas based on the cluster size; and determining, using the processor of the server, a set of locations that are disposed in the area. The method also includes: determining, using the processor of the server, the grid area of the plurality of grid areas that corresponds to the respective location; and dividing, using the processor of the server, the set of locations into a plurality of groups based on the grid area that corresponds to each respective location. The method includes, within each group of the plurality of groups, scoring and sorting the locations of the group according to a set of criteria using the processor of the server, and assigning a respective rank to each of the locations of the group according to the relative position of each of the locations in the group using the processor of the server. The method includes recombining, using the processor of the server, the locations of plurality of groups and sorting by rank to yield a grid-ranked set of locations; and sending, to the processor of the client, the grid-ranked set of locations.

In an embodiment, a system, includes a server having a network interface, a memory that stores location data, and a processor configured to execute instructions stored in the memory of the server. The instructions cause the processor to receive, via the network interface, a query from a client that defines an area; subdivide the area into a plurality of grid areas based on a cluster size; and determine a set of locations that are disposed in the area from the location data stored in the memory of the server. For each respective location in the set of locations, the instructions cause the processor to determine the grid area of the plurality of grid areas that corresponds to the respective location; and divide the set of locations into a plurality of groups based on the grid area that corresponds to each respective location. The instructions cause the processor to, within each group of the plurality of groups, score and or sort the locations of the group according to a set of criteria and assign a rank to each of the locations of the group according to the relative position of each of the locations in the group. The instructions cause the processor to recombine the locations of plurality of groups and sort by rank to yield a grid-ranked set of locations; and send, via the network interface, the grid-ranked set of locations in response to the client query.

DRAWINGS

These and other features, aspects, and advantages of the present disclosure will become better understood when the following detailed description is read with reference to the accompanying drawings in which like characters represent like parts throughout the drawings, wherein.

Figure 7:
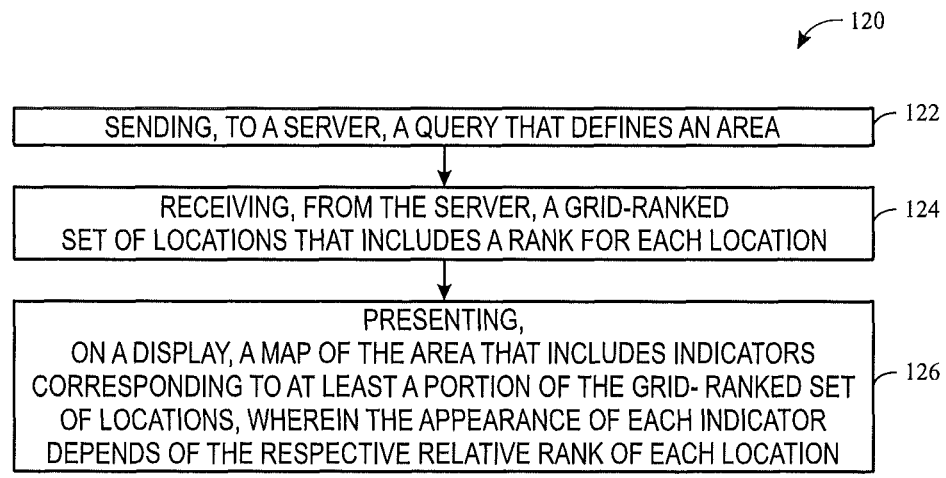
Figure 8:
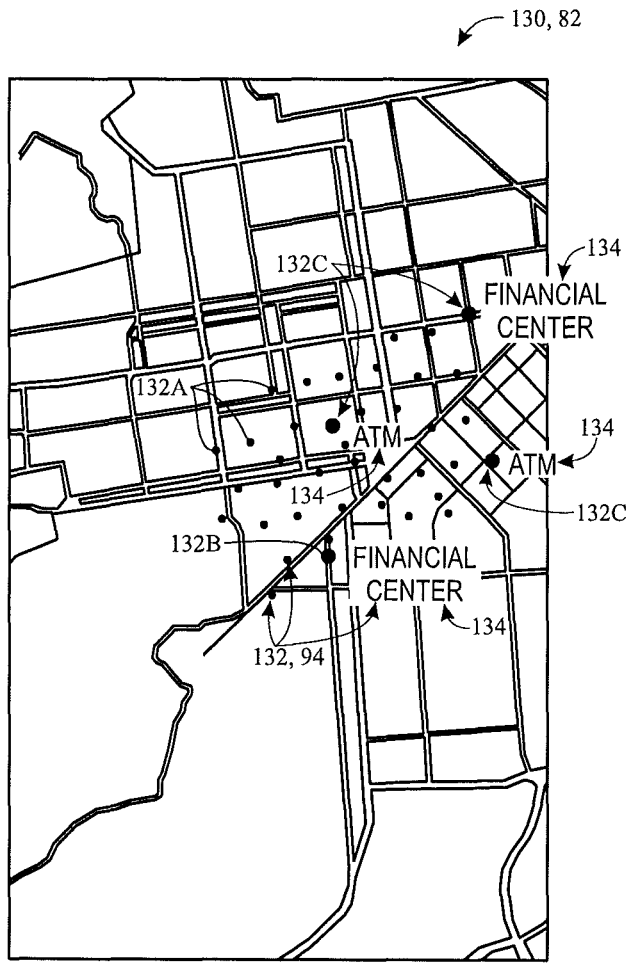

FIG. 7 is a flow diagram of an example process whereby the client queries the server, receives a grid-ranked set of locations, and presents visual representations of the grid-ranked set of locations on a map on a display of the client, in accordance with embodiments of the present technique; and FIG. 8 is an example of a map presented by a display of a client device that includes visual representations of at least a portion of the grid-ranked set of locations received from the server, in accordance with embodiments of the present technique.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are directed toward systems and methods for effectively organizing and ranking location data according to relevant criteria in a tunable and scalable manner. For example, present embodiments enable the user, upon using an electronic location and mapping system to search for a location in a given area, to be presented with a map of the area that includes a substantially even distribution of only the most relevant search results across the area. The present technique can utilize any number of ranking criteria or algorithms, and can be easily tuned to improve performance of the electronic location and mapping system for areas having high population/destination density. Indeed, present embodiments improve computational functionality and graphical user interface presentation of processor-based devices (e.g., components of the electronic location and mapping system) handling user requests related to destination searches and subsequent presentations of location and mapping data. The present technique is computationally efficient and scalable, and can be implemented in a server/client environment or on a stand-alone device, in certain embodiments. For example, in certain embodiments, the runtime of the grid-based ranking method scales according to the following relationship:

$$RT = O(2*n) + O(n*\log(n)) \qquad \text{Eq. 1}$$

wherein RT is runtime and n is the number of locations. By comparison, the runtime of other non-grid-based ranking methods, in which each location is comparatively evaluated relative to every other location, generally scales according to the following mathematical relationship:

$$RT = O(2*n^2) + O(n*\log(n)) \qquad \text{Eq. 2}$$

As such, the disclosed grid-based ranking method scales substantially better than other methods and enables substantially shorter runtime, which facilitates more efficient use of processing time.

Figure 1:
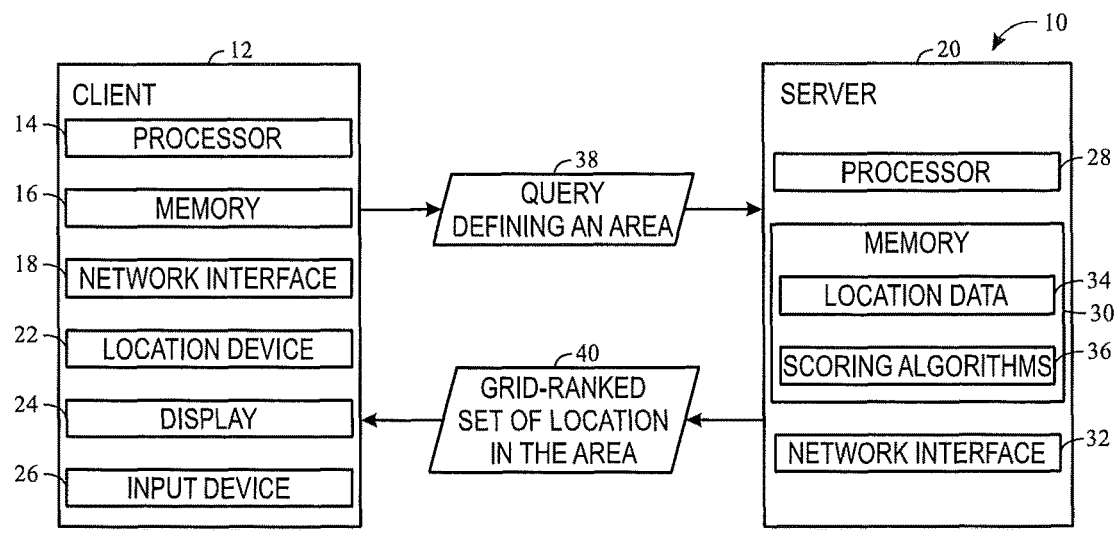
FIG. 1 is a schematic of a client/server location and mapping system, in accordance with embodiments of the present technique.

In certain embodiments, the present technique may be specifically implemented in a server/client environment, such as in the electronic location and mapping system 10 illustrated in FIG. 1. The example embodiment illustrated in FIG. 1 includes a client 12 (e.g., a client computing device), which may be a smart phone, a tablet, or another portable electronic computing device capable of providing the functionality described herein. The client illustrated in FIG. 1 includes a processor 14 and a memory 16, which cooperate to store and execute instructions to control the operation of the client 12 and provide the disclosed functionality. The illustrated client 12 also includes a network interface 18 that enables the client to communicate with remote devices, such as a server 20, via a wired or wireless network connection.

In certain embodiments, the client 12 further includes one or more location devices 22, such as GPS devices, A-GPS device, or other suitable location positioning devices capable of determining a location of the client 12 based on one or more external wireless signals. The client 12 also includes a display 24 for presenting information (e.g., maps, routes, directions) to the user of the client (e.g., via a graphical user interface), as well as one or more input devices 26 (e.g., touchscreen, physical buttons) to enable a user to interface with and use the client 12. In other embodiments, the client 12 may include different or additional components, in accordance with the present disclosure.

The server 20 of the example electronic location and mapping system 10 illustrated in FIG. 1 is particularly a database server 20. In other embodiments, the server 20 may be a web server, an application server, or any other suitable server capable of performing the disclosed functionality. The illustrated database server 20 includes a processor 28 and a memory 30, which cooperate to store and execute instructions to control the operation of the server 12 to provide the functionality described herein. The illustrated database server 20 includes a network interface 32 that enables the server to communicate with the client 12 via wired or wireless networks. In other embodiments, the server 20 may include different or additional components, in accordance with the present disclosure.

The server 20 generally stores, in memory 30, a collection (e.g., a database) of location data 34 that includes information about the identity, longitude and latitude coordinates, and other relevant information regarding locations within an area. For example, the location data 34 may include any suitable information that can be used to describe, depict, and/or score a location. For example, in certain embodiments, the location data 34 may include information about products and/or services provided at each location, reviews, comments, or ratings provided by users that have visited each location, images or graphical representations (e.g., logos) of each location, or any other relevant information regarding the locations.

Additionally, as illustrated in FIG. 1, the server 20 may also store, in memory 30, one or more scoring algorithms 36. These scoring algorithms 36 are sets of instructions that, when executed by the processor 28 of the server 20, determine a score for a location according to a set of criteria. In certain embodiments, the criteria may be entirely defined by the business operating the server 20, and may be used to relatively score certain locations higher than others to promote business traffic to those locations. For example, in certain embodiments, a scoring algorithm 36 might give a higher score to locations offering a wider array of products/services than other locations, to newer locations that are underutilized compared to established, high-traffic locations, or to company owned locations instead of competitor locations. By specific example, for a banking company, a scoring algorithm 36 may score wealth management centers that offer the greatest number of products and services higher than local branches that offer some products and services, and may score lowest automated teller machines (ATMs) that offer the fewest products and services. In certain embodiments, in addition to defining the area when submitting a query 38 to the server 20, the client 12 may include inputs that affect how the scoring algorithm 36 scores locations. For example, based on user input or preferences, the client 12 may instruct or request the server 20 to prioritize certain types of locations, to filter or ignore certain types of locations, to limit (e.g., filter) the returned set of locations to a particular number of locations, and/or to consider distance between the location and a specified set of coordinates (e.g., the current location of the client device or user) as factors when ranking locations.

For example, client location and mapping software (e.g., a program or an app) may be executed by the processor of the client device (e.g., a smart phone operated by a user), and the user may utilize the software to submit search queries 38 to the remote database server 20 via a wireless data channel (e.g., WiFi, cellular). For such embodiments, the memory 30 and processor 28 of the server 20 cooperate to execute instructions to perform the disclosed location grid-ranking method, and respond to search queries 38 submitted by the client 12 with grid-ranked location datasets 40, as discussed below.

In general, the disclosed process involves subdividing a given map area into a number of grid areas (e.g., subdivisions of the area, subareas), and then independently sorting and ranking the locations disposed in each grid area. From a processing standpoint, this allows the locations in each grid area to be ranked only relative to other locations in the same grid area, and allows the various grid areas to be scored, sorted, and ranked in parallel. As such, the disclosed process enables substantial computational performance gains compared to other methods that involve analyzing an entire map area as a whole and ranking all locations in the map area relative to one another. Further, rather than merely returning clumps or clusters of locations concentrated in a particular portion of the map area, the disclosed approach ensures a more even distribution of relevant search results across the entire map area, which provides for more effective and efficient use and operation of a graphical user interface displaying the map area.

Figure 2:
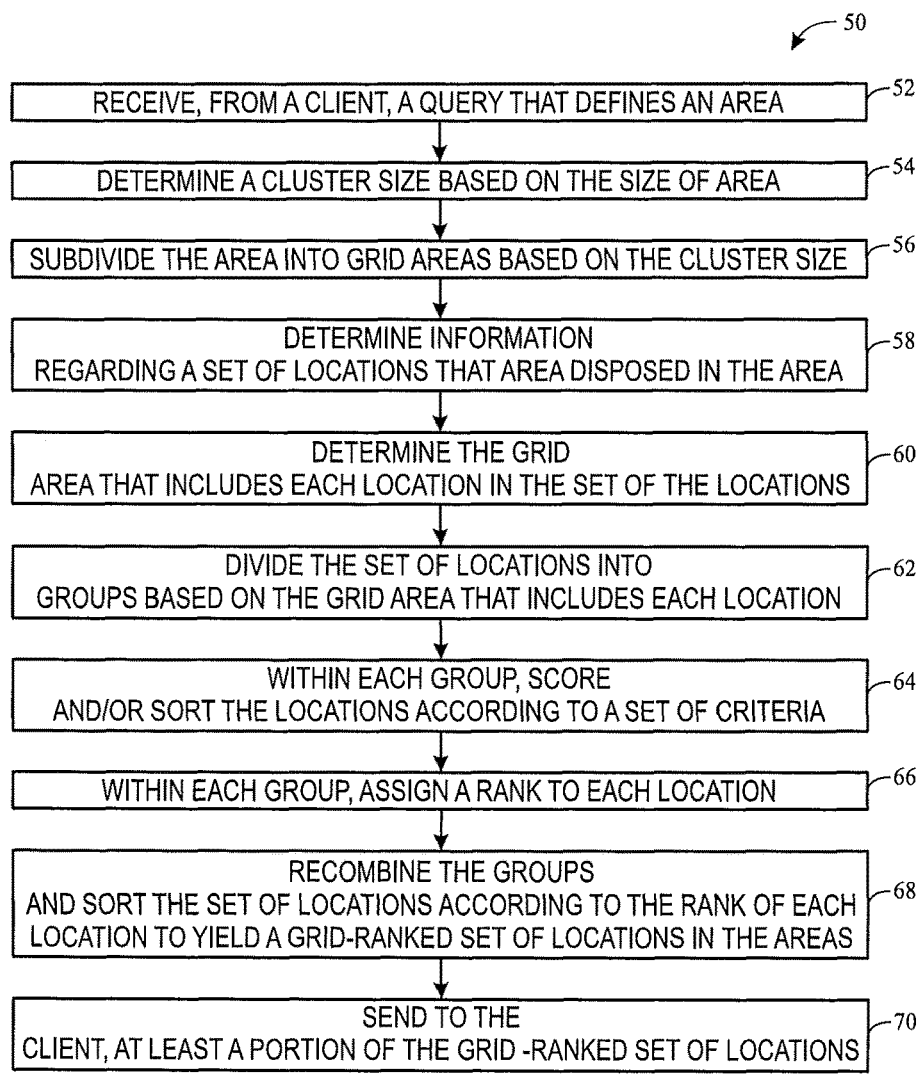
FIG. 2 is a flow diagram of a process whereby the server provides a grid-ranked set of locations in an area in response to a query of a client, in accordance with embodiments of the present technique.

With the foregoing in mind, FIG. 2 is a flow diagram of an example embodiment of a process 50 whereby the server 50 responds to the query 38 of the client 12 regarding a particular area with a grid-ranked set of relevant locations 40 within the indicated area. In certain embodiments, at least a portion of the process illustrated in FIG. 2 may specifically be performed in the database (DB) layer (e.g., within a database application using a structured query language), and may be seamless to the client 12. The illustrated process 50 begins with the processor 28 of the server 20 receiving (block 52), from the client 12, a query 38 that defines the area of interest. For example, in certain embodiments, the client query 38 may define the area based on a set of coordinates (e.g., longitude and latitude coordinates for a top right corner and a bottom left corner of the area). Additionally, in certain embodiments, the processor 28 of the server 20 may also receive other information from the client 12, for example, criteria for scoring and sorting locations, a maximum number of locations to return over the entire map area, or a maximum number of locations to return over each individual grid area, or other suitable inputs. In other embodiments, the server 20 may only receive from the client 12 coordinates that define the area of interest.

Next, the processor 28 of the server 20 may determine (block 54) a cluster size based on the size of the area. For example, in certain embodiments, the cluster size may be determined according to the following equation:

$$\text{cluster\_size} = \frac{\min(\text{abs}(\text{latitude}_{TR} - \text{latitude}_{BL}), \text{abs}(\text{longitude}_{TR} - \text{longitude}_{BL}))}{\text{cluster\_strength}} \quad \text{Eq. 3}$$

wherein $\text{latitude}_{TR}$ is the latitude of the top right corner of the area, $\text{longitude}_{TR}$ is the longitude of the top right corner of the area, $\text{latitude}_{BL}$ is the latitude of the bottom left corner of the area, $\text{longitude}_{BL}$ is the longitude of the bottom left corner of the area, min(x,y) returns the lesser of x and y, and abs(x) returns the absolute value of x. It may be appreciated that, in Eq. 3, the minimum of the difference between latitude values and longitude values is used to ensure that each of the grid areas is square-shaped. It may be noted that, if either latitude or longitude were favored in the calculation, this would result in the generation of problematic rectangular grid areas instead of the square grid areas enabled by the equation above. In certain embodiments, the cluster strength is a value having a range between approximately 3 and approximately 7 (e.g., between approximately 3.5 and approximately 5.5, between approximately 4.5 and approximately 5.5). In general, cluster strength affects the size of each of the grid areas: a lower cluster strength value results in fewer, larger grid areas, while a higher cluster strength value results in smaller, more numerous grid areas. As such, in certain embodiments, cluster strength may be adjusted (e.g., increased or decreased) based on population density or location density within a particular area to promote more even distribution of results over the requested map area.

Figure 3:
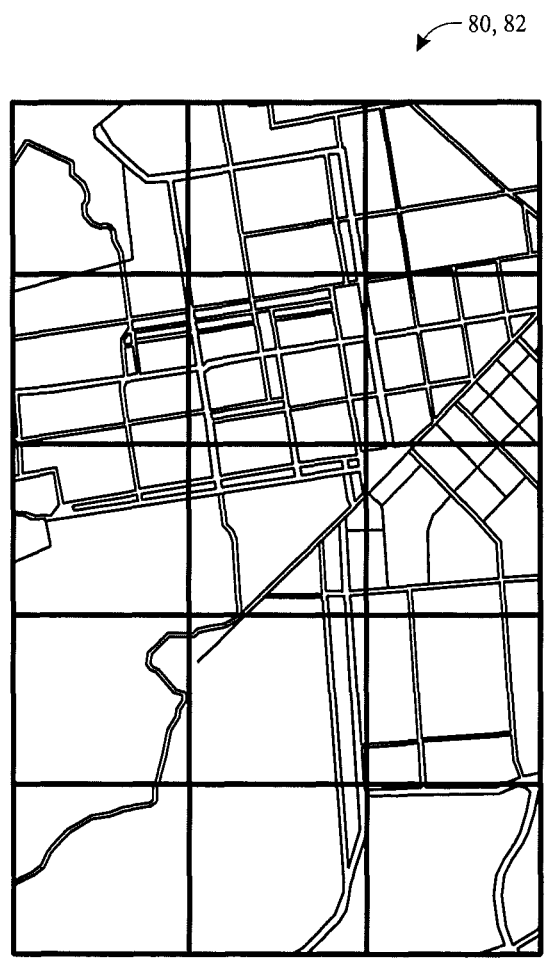
FIG. 3 is a visual representation of an example of the server subdividing the area into grid areas based on the size of the area, in accordance with embodiments of the present technique.

Continuing through the process 50 illustrated in FIG. 2, the processor 28 of the server 20 may then subdivide (block 56) the area indicated in the client query 38 into smaller, square-shaped grid areas based on the cluster size. FIG. 3 illustrates a visual depiction 80 of the logical operation performed by the server during this subdividing step. It may be generally noted that, for the example illustrated in FIGS. 3-6 and 7, the client query defines an area using coordinates: latitude 37.736 degrees, longitude −122.458 degrees (bottom left corner of the area) and latitude 37.806 degrees, longitude −122.393 degrees (top right corner the area). As such, using Eq. 1, the cluster size is subsequently computed using a cluster strength of 3.5 to yield a cluster size of approximately 0.0184 degrees (longitude), for this example. Accordingly, as illustrated in FIG. 3, the area 82 has been logically subdivided by a grid into a plurality of square-shaped grid areas each having sides having a length of approximately 0.0184 degrees (longitude).

Figure 4:
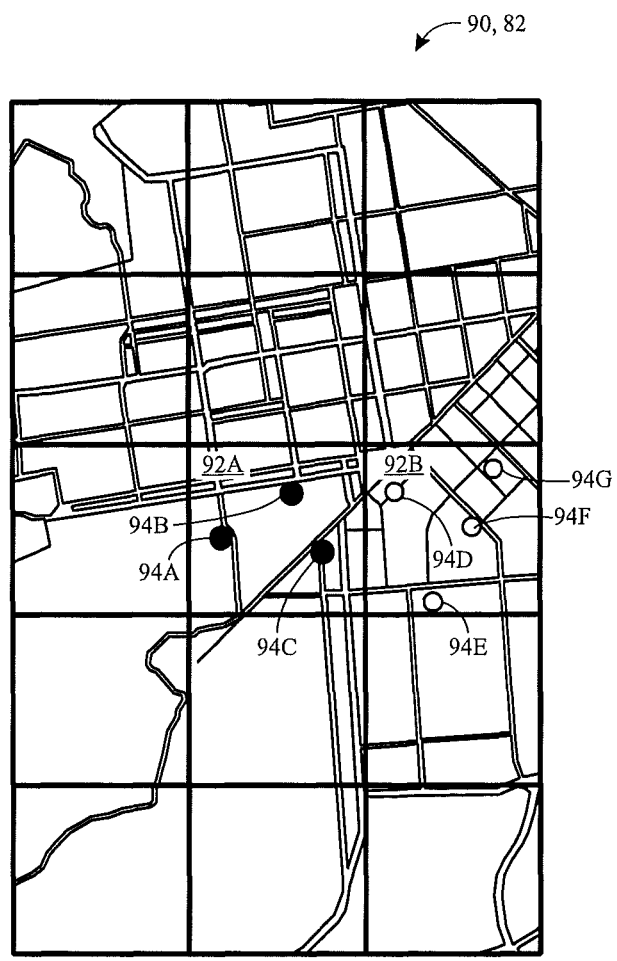
FIG. 4 is a visual representation of an example of the server determining locations present within the area, in accordance with embodiments of the present technique.

Continuing through the process 50 illustrated in FIG. 2, the processor 28 of the server 20 queries the location data 34 stored in memory 30 to determine (block 58) information regarding a set of locations that are disposed in the area defined in the client query 38. For example, FIG. 4 illustrates a visual depiction 90 of the logical operation performed by the server when determining locations present within the grid area 82. In particular, as illustrated in FIG. 4, two particular grid areas 92 (e.g., grid area 92A and 92B) each include a number of circular symbols for a number of locations 94, each indicating a particular location (e.g., location 94A, 94B, 94C, 94D, 94E, 94F, and 94G) that is positioned within the area 82.

Continuing through the process 50 illustrated in FIG. 2, the processor 28 of the server 20 may determine (block 60) which grid area includes each location in the set of locations. For the example embodiment, the processor 28 of the server 20 determines which grid area 92 includes each location by determining a latitude group value and a longitude group value for each of the locations 94. For the example, the latitude group value of a location is the latitude of the bottom left corner of the grid area that includes the location, and the longitude group value of a location is the longitude of the bottom left corner of the grid area that includes the location.

As such, the latitude group value of a location may be calculated by the processor 28 of the server 20 using the following equation:

$$\text{latitute\_group} = \text{floor}\left(\frac{\text{location\_latitude}}{\text{cluster\_size}}\right) * \text{cluster\_size} \quad \text{Eq. 4}$$

wherein location_latitude is the latitude of the location, and the floor(x) function rounds x downward, returning the largest integer value less than x. Similarly, the longitude group value of a location may be calculated by the processor 28 of the server 20 using the following equation:

$$\text{longitude\_group} = \text{floor}\left(\frac{\text{location\_longitude}}{\text{cluster\_size}}\right) * \text{cluster\_size} \quad \text{Eq. 5}$$

wherein location_latitude is the longitude of the location.

Figure 5:
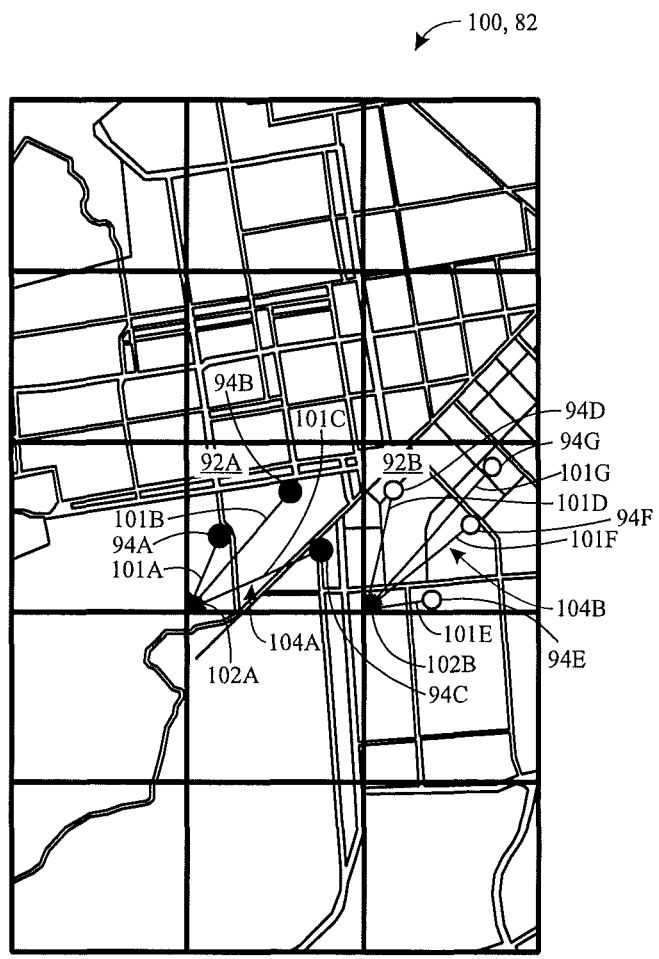
FIG. 5 is a visual representation of an example of the server determining which grid area includes each location, in accordance with embodiments of the present technique.

FIG. 5 illustrates a visual depiction 100 of the logical operation performed by the server 20 when determining which grid area includes each location in the set, corresponding to the actions set forth in block 60. As illustrated in FIG. 4, in FIG. 5, two particular grid areas 92 (e.g., grid areas 92A and 92B) include a number of circular symbols for a number of locations 94, each indicating a particular location (e.g., location 94A, 94B, 94C, 94D, 94E, 94F, and 94G) that is positioned within the area 82. Further, each of the locations 94 includes a respective line (e.g., lines 101A, 101B, 101C, 101D, 101E, 101F, 101G) coupling the location with a particular set of coordinates associated with the area 82, in this case, the bottom left corners 102A and 102B of grid areas 92A and 92B, respectively. As such, FIG. 5 visually indicates determining the latitude group value and a longitude group value of each location to be the latitude and longitude of the bottom left corner of the respective grid area that contains the location. In other embodiments, the latitude group value and a longitude group value may be a different corner (e.g., bottom right, top left, top right) or another point (e.g., the center) of the grid areas 92, in accordance with the present disclosure.

Returning to the process 50 of FIG. 2, subsequently, the processor 28 of the server 20 may divide (block 62) the locations 94 into groups based on the grid areas 92 that contain each of the locations 94. For the example embodiment, the processor 28 of the server 20 divides the locations into groups 104 (e.g., group 104A, group 104B) having the same latitude group value and a longitude group value (e.g., having the same grid area 92A or 92B). In other words, as illustrated in FIG. 5, locations 94A, 94B, and 94C are put into a first group corresponding to grid area 92A, while locations 94D, 94E, 94F, and 94G are put into a second group that corresponds to grid area 92B. It may be appreciated that, once the set of all locations 94 in the area 82 is divided into groups 104, the relative rank of locations 94 within one group 104A (e.g., within grid area 92A) do not impact the rank of locations within another group 104B (e.g., within grid area 92B). Therefore, it is presently recognized that the disclosed technique enables each of the groups 104 (e.g., the respective locations 94 in each grid area 92) to be independently analyzed, compared, and ranked. As such, in certain embodiments, the server 20 may include a multi-core processor 28, and individual cores of the processor 28 may score and sort the locations of each of the groups 104 in parallel.

For example, as illustrated in FIG. 2, within each group 104, the processor 28 of the server 20 may score and/or sort (block 64) the locations 94 according to a set of criteria. As set forth above, in certain embodiments, the memory 30 of the server 20 stores one or more scoring algorithms 36 capable of generating a numerical score (e.g., an integer or floating point value) representative of the relative importance of a location (e.g., location 94A) relative to a defined set of criteria. As mentioned, the criteria may vary in different embodiments, to enable the business and/or the user to control how locations are to be scored by the scoring algorithms 36. Additionally, in certain embodiments, a scoring algorithms 36 may include a machine learning algorithm that receives input indicating which locations are preferentially being viewed, selected, and/or visited by the client/users, and may output a numerical score favoring these locations over others. In this way, the scoring algorithm may improve in scoring quality based on users' behavior, improving operation of the location and mapping system 10 as a whole over time. In certain embodiments, the locations 94 in a group 104 may be subsequently sorted based, at least in part, on the score determined by the scoring algorithm 36. In certain embodiments, the locations 94 in a group 104 may, additionally or alternatively, be sorted based on criteria defined by the business or the user. In certain embodiments, a score generated by a scoring algorithm 36 may be one of multiple sort criteria. For example, in certain embodiments, in addition or alternative to computing a score for each of the locations 94, the processor 28 of the server 20 may sort the locations 94 within each of the groups 104 based at least in part in a predefined preference (e.g., financial centers above local bank branches above ATMs) of the business or user.

Figure 6:
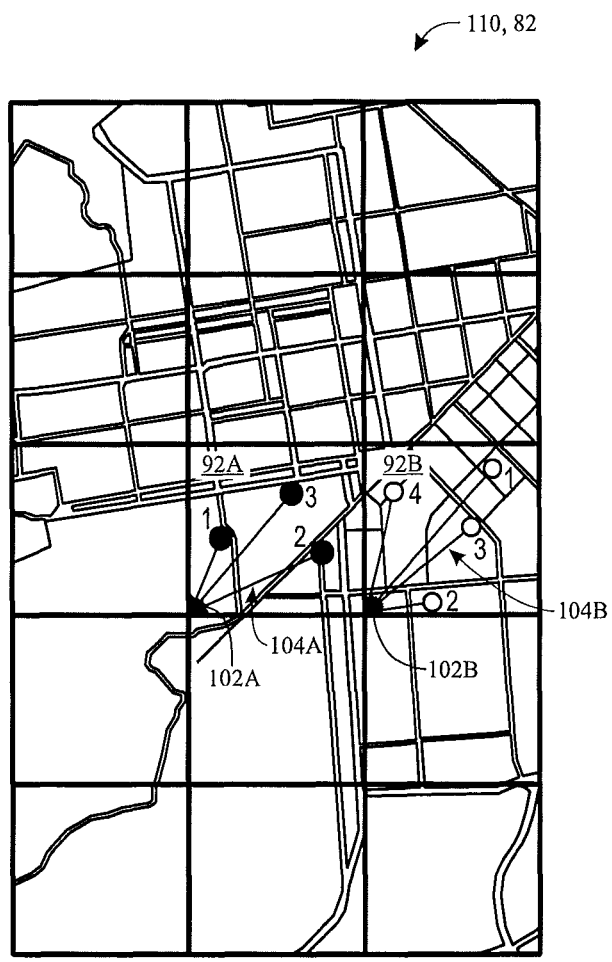
FIG. 6 is a visual representation of an example of the server ranking each location within each grid area independently, in accordance with embodiments of the present technique.

Continuing through the process 50 illustrated in FIG. 2, once each group has been scored and/or sorted according to the appropriate criteria, the processor 28 of the server 20 may assign (block 66) a rank to the locations 94 of each of the groups 104 based on their relative position within their respective sorted group. For example, the first location in a group, which is most relevant based on the applied criteria, may be assigned the highest rank (e.g., 1), and the second most relevant location in the group may be assigned the second highest rank (e.g., 2), and so forth. FIG. 6 illustrates a visual depiction 110 of the logical operation performed by the server 12 during ranking of the locations 94. As discussed, the illustrated locations 94 indicated within the grid areas 92 (e.g., grid area 92A and 92B) are each assigned a rank (e.g., 1, 2, 3, 4) based on their relative position within their respective sorted group (e.g., group 104A and 104B). Further, in certain embodiments, the processor 28 of the server 20 may limit (e.g., truncate, filter) the number of locations 94 in each of the groups 104 so that each of the grid areas 92 only includes a certain number of locations 94, only include results having a at least a minimum threshold rank, or apply another suitable filter to limit the number of results.

Continuing through the process 50 illustrated in FIG. 2, at some point after independently ranking the locations 94 within each of the groups 104, the processor 28 of the server 20 may recombine (block 68) the locations 94 from the various groups 104 and sort the recombined set of locations 94 according to their respective ranks to yield the grid-ranked set of locations 40. For example, the grid-ranked set of locations 40 might begin with all locations having the highest ranking value (e.g., 1) in their respective grid area, followed by all locations having the second highest ranking value (e.g., 2) in their respective grid area, and so forth. In certain embodiments, the processor 28 of the server 20 may, additionally or alternatively, limit (e.g., truncate) the grid-ranked set of locations 40 to limit the total number of locations 94 in the set to a particular value or to remove locations having a ranking below or above a particular threshold value. Subsequently, the processor 28 of the server 20 may send, to the client 12, at least a portion of the grid-ranked set of locations 40 in response to the client query 38. For example, in certain embodiments, the processor 28 of the server 20 may send (block 70), to the client, the grid-ranked set of locations 40 in the form of a table of location data, wherein each row represents a particular location and each column represents a property or attribute of the location.

FIG. 7 is a flow diagram illustrating an example of a process 120 whereby the processor 14 of the client 12 provides the query 38 to the server 20, receives the grid-ranked set of locations 40, and then utilizes the grid-ranked set of locations 40 to present a map that includes a visual representation of at least a portion of the received grid-ranked set of locations 40. The illustrated process 120 begins with the processor 14 of the client 12 sending (block 122) to the server 12 the query 38 that at least defines the area 82. As set forth above, in certain embodiments, the client query 38 may include additional parameters (e.g., a maximum number of locations 94, maximum number of locations 94 per grid area 92, a minimum rank of locations 94, ranking algorithm 36 to be applied, cluster strength, cluster size), which the processor 28 of the server 20 may use in determining the grid-ranked set of locations 40 to return to the client 12. After receiving the query 38 from the client, the server 20 may perform a process (e.g., similar to the process 50 illustrated in FIG. 2) to generate the grid-ranked set of locations 40 positioned within the indicated area 82.

Continuing through the process 120 illustrated in FIG. 7, the processor 14 of the client 12 subsequently receives (block 124), from the server 20, the grid-ranked set of locations 40. Then, the client 12 presents (block 126), on the display 24, a map of the area, including visual representations (e.g., indicators, icons, labels) corresponding to at least a portion of the grid-ranked set of locations 40 received from the server 20. For example, FIG. 8 illustrates an example of a map 130 presented by the display 24 (e.g., as a graphical user interface) of the client 12 that includes visual representations 132 of locations 94 from the grid-ranked set of locations 40 received from the server 20 in an embodiment. As noted above, as a result of the disclosed grid-ranking process 50 discussed above, the locations 94 represented in the map of FIG. 8 are distributed more evenly across the illustrated area 82 than they would be if all locations 94 were ranked directly against one another regardless of their relative positions within the area 82, as is done in other methods. In other words, the disclosed grid-ranking process 50 ensures that the locations 94 within grid-ranked set of locations 40 are not clustered in such a tight group as to obstruct a user's view of the underlying features of the map (e.g., streets, highways, obstacles, parks, waterways) or prevent a user from being able to differentiate between and/or select particular locations presented (e.g., using a touchscreen, touchpad, or cursor input device 26 of the client 12).

Additionally, in certain embodiments, visual representations 132 of the locations 94 displayed on the map 130 may depend, at least in part, on the respective rank of the locations 94. In certain embodiments, visual representations 132 of locations 94 may be larger or smaller, different colors, different shapes, or as having changing appearances (e.g., blinking, color changing) based on the relative rank of the location. For example, as illustrated in the example map 130 of FIG. 8, certain lower ranked locations 94 are visually represented by small, circular indicators 132A and do not include labels. Locations 94 having a slightly higher ranks are visually represented by relatively larger, circular indicators 132B and also do not include labels. Locations 94 having the highest ranks are visually represented by the largest, circular indicators 132C and also include labels 134 that indicate, in text, the identity of the location (e.g., financial centers, ATMs). This helps to ensure that the highest ranking locations 94, which are larger and occlude the greatest portion of underlying map features, are evenly spread throughout the map 130. Additionally, while previous methods might emphasize the appearance of high ranking locations 94, the disclosed grid-ranking process 50 ensures each grid area 92 that includes at least one location 92 also includes at least one high-ranking, highly-emphasized location (e.g., including the relatively largest indicator 132C and/or including a textual label 134).

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
   receiving, from a processor of a client, a query that defines an area;
   determining, using a processor of a server, a cluster size based on the size of the area;
   subdividing, using the processor of the server, the area into a plurality of grid areas based on the cluster size;
   determining, using the processor of the server, a set of locations that are disposed in the area;
   for each respective location in the set of locations, determining, using the processor of the server, the grid area of the plurality of grid areas that corresponds to the respective location;
   dividing, using the processor of the server, the set of locations into a plurality of groups based on the grid area that corresponds to each respective location;
   for each group of the plurality of groups:
     scoring and sorting the locations within the group according to a set of criteria by comparatively evaluating each of the locations within the group only relative to other locations of the group, and then
     assigning a respective rank to each of the locations within the group according to the relative position of each of the locations in the scored and sorted group, wherein each of the locations of the group is ranked only relative to the other locations of the group, and each of the plurality of groups is scored, sorted, and ranked in parallel with one another;
   recombining, using the processor of the server, the locations of the plurality of groups and sorting by the assigned respective rank of each of the locations in each of the plurality of groups to yield a grid-ranked set of locations, wherein the grid-ranked set of locations includes a top-ranking location for each of the plurality of grid areas having at least one location therein; and
   sending, to the processor of the client, the grid-ranked set of locations.

2. The method of claim 1, wherein the set of criteria used by the processor of the server to score and sort each of the locations within each of the plurality of groups includes a number of products and/or services offered at each of the locations, an age of each of the locations, and a level of business or traffic at each of the locations.

3. The method of claim 1, wherein the cluster size is calculated by the processor of the server using the following equation:

$$\text{cluster\_size} = \frac{\min(\text{abs}(\text{latitude}_{TR} - \text{latitude}_{BL}), \text{abs}(\text{longitude}_{TR} - (\text{Longitude})_{BL})))}{\text{cluster\_strength}}$$

wherein latitude$_{TR}$ is a latitude of the top right corner of the area, longitude$_{TR}$ is the longitude of the top right corner of the area, latitude$_{BL}$ is the latitude of the bottom left corner of the area, longitude$_{BL}$ is the longitude of the bottom left corner of the area, and cluster_strength is a positive value between 3 and 7.

4. The method of claim 3, wherein the cluster strength is between 3.5 and 5.5.

5. The method of claim 1, wherein:
the processor of the server limits a number of locations in each of the plurality of groups to a first predetermined value when dividing the set of locations into the plurality of groups; and
the method comprises removing, using the processor of the server, particular locations from the plurality of groups before recombining the locations of the plurality of groups, wherein the respective rank of each of the particular locations is below a second predetermined value.

6. The method of claim 1, comprising removing, using the processor of the server, particular locations from the grid-ranked set of locations before sending the grid-ranked set of locations to the processor of the client, wherein the respective rank of each of the particular locations is below a threshold value.

7. The method of claim 1, comprising:
sending, using the processor of the client, the query that defines the area to the processor of the server, and in response, receiving the grid-ranked set of locations from the processor of the server; and
presenting, on a display of the client, a map of the area that includes a plurality of indicators that respectively correspond to the grid-ranked set of locations.

8. The method of claim 7, wherein:
each indicator of a first portion of the plurality of indicators is relatively larger than each indicator of a second portion of the plurality of indicators,
each indicator of the first portion of the plurality of indicators corresponds to a respective top-ranking location in each of the grid areas, and
each indicator of the second portion of the plurality of indicators corresponds to a location that is not the respective top-ranking location in each of the grid areas.

9. The method of claim 1, wherein determining the grid area that corresponds to each respective location comprises calculating a latitude group and a longitude group of each respective location using the following equations:

$$\text{latitude}_{group} = \text{floor}\left(\frac{\text{location\_latitude}}{\text{cluster\_size}}\right) * \text{cluster\_size}$$

$$\text{longitude}_{group} = \text{floor}\left(\frac{\text{location\_longitude}}{\text{cluster\_size}}\right) * \text{cluster\_size}$$

wherein location latitude is the latitude of the respective location and location longitude is the longitude of the respective location.

10. A system, comprising:
a server having a network interface, a memory that stores location data, and a processor configured to execute instructions stored in the memory of the server to:
receive, via the network interface, a query from a client that defines an area;
subdivide the area into a plurality of grid areas based on a cluster size;
determine a set of locations that are disposed in the area from the location data stored in the memory of the server;
for each respective location in the set of locations, determine the grid area of the plurality of grid areas that corresponds to the respective location;
divide the set of locations into a plurality of groups based on the grid area that corresponds to each respective location;
for each group of the plurality of groups:
score and sort the locations within of the group according to a set of criteria by comparatively evaluating each of the locations within the group only relative to other locations of the group, and then
assign a respective rank to each of the locations within the group according to the relative position of each of the locations in the scored and sorted group, wherein each of the locations of the group is ranked only relative to the other locations of the group, and each of the plurality of groups is scored, sorted, and ranked in parallel with one another;
recombine the locations of the plurality of groups and sort by the assigned respective rank of each of the locations in each of the plurality of groups to yield a grid-ranked set of locations, wherein the grid-ranked set of locations includes a top-ranking location for each of the plurality of grid areas having at least one location therein; and
send, via the network interface, the grid-ranked set of locations in response to the query.

11. The system of claim 10, comprising the client having a memory, a processor, a network interface, and a display, wherein the memory of the client stores instructions that, when executed by the processor of the client, causes the client to:
send, via the network interface of the client, the query that defines the area to the processor of the server, and in response, receive the grid-ranked set of locations from the processor of the server; and
present, on the display of the client, a map of the area that includes a plurality of indicators that respectively correspond to the grid-ranked set of locations.

12. The system of claim 10, wherein the location data stored in the memory of the server comprises an identity or name, longitude and latitude coordinates, a description of products and/or services, an image, a logo or other visual representation, a customer review or comment, and/or a customer rating, for each of the locations in the area.

13. The system of claim 10, wherein the processor is configured to execute instructions stored in the memory of the server to determine a cluster size based on the size of the area and a cluster strength, wherein the cluster strength is higher when the area has a high location density and wherein the cluster strength is lower when the area has a low location density.

14. A system, comprising:
a client that is a portable electronic device having a memory, a processor, a network interface, and a display, wherein the memory of the client stores instructions that, when executed by the processor of the client, cause the client to:
send, via the network interface of the client, a query to a processor of a database server that defines an area;
receive, via the network interface of the client, a grid-ranked set of locations from the processor of the database server, wherein each location of the grid-ranked set of locations is located within one of a plurality of grid areas that comprise the area, wherein each location of the grid-ranked set of locations is scored, sorted, and ranked by the processor of the database server by comparatively evaluating the location only relative to other locations within the same grid area according to a set of criteria, and wherein the grid-ranked set of locations includes a top-ranking location for each of the plurality of grid areas having at least one location therein; and
present, on the display of the client, a map of the plurality of grid areas that comprise the area, wherein the map includes a plurality of indicators that respectively correspond to the grid-ranked set of locations received from the database server, and wherein a first portion of the plurality of indicators correspond to each top-ranking location and are larger than a second portion of the plurality of indicators that correspond to non-top-ranking locations of the grid-ranked set of locations.

15. The system of claim 14, wherein the client includes a location device comprising a global position system (GPS) or assisted GPS (A-GPS) and the processor of the client is configured to determine a current location of the client and include the current location of the client in the query, and wherein the processor of the database server is configured to use the current location of the client as scoring and sorting criteria when the set of locations is grid-ranked.

16. The system of claim 11, wherein the query includes additional parameters and the server is configured to use the additional parameters to generate the grid-ranked set of locations.

17. The system of claim 16, wherein the additional parameters comprise a maximum number of locations of the grid-ranked set of locations, a maximum number of locations per grid area, a minimum rank threshold, or a combination thereof.

18. The system of claim 16, wherein the additional parameters comprise a cluster strength, a cluster size, or a combination thereof.

19. The method of claim 1, wherein the set of criteria used by the processor of the server to score and sort each of the locations within each of the plurality of groups includes a relative distance from a current location of the client.

20. The system of claim 14, wherein the plurality of indicators comprises a third portion, wherein each indicator of the third portion of the plurality of indicators:
is larger than each indicator of the second portion of the plurality of indicators;
is smaller than each indicator of the first portion of the plurality of indicators; and
corresponds to a non-top ranking location of the grid-ranked set of locations having a relatively higher ranking than a ranking for a non-top ranking location corresponding to an indicator of the second portion of the plurality of indicators.

* * * * *